United States Patent Office 3,251,837
Patented May 17, 1966

3,251,837
DERIVATIVES OF 1,2,4-BENZOTHIADIAZINE-
1,1-DIOXIDES
Gerald F. Holland, Groton, Conn., assignor to Chas.
Pfizer & Co., Inc., New York, N.Y., a corporation of
Delaware
No Drawing. Filed Sept. 14, 1962, Ser. No. 223,822
14 Claims. (Cl. 260—243)

This invention relates to a new series of useful therapeutic agents. More particularly, it is concerned with a novel class of 1,2,4-benzothiadiazine-1,1-dioxides which have utility as antihypertensive agents without having the drawbacks possessed by those of the prior art. There is also intended to be included within the scope of this invention various salts which such compounds will form with pharmacologically acceptable bases.

The compounds which are included within the purview of this invention are all selected from the class of 3,6- and 3,7-disubstituted-1,2,4-benzothiadiazine-1,1-dioxides of the formulae:

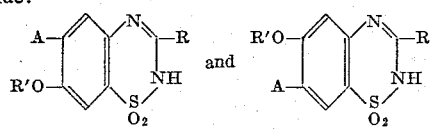

wherein R is a member selected from the group consisting of alkyl having from one to six carbon atoms, lower haloalkyl, alkoxy(lower alkyl) wherein the alkoxy group has from one to three carbon atoms, lower alkylthio-(lower alkyl), cycloalkyl having up to eight carbon atoms, benzyl, p-chlorobenzyl, β-phenylethyl, m-xylyl, phenyl, p-chlorophenyl, p-tolyl and p-anisyl; A is a member selected from the group consisting of hydrogen, fluorine, chlorine, bromine, trifluoromethyl, lower alkyl, phenyl, p-chlorophenyl, p-tolyl, p-anisyl, lower alkoxy, cycloalkoxy having up to eight carbon atoms, benzyloxy, p-chlorobenzyloxy, β-phenylethyloxy, m-xylyloxy, phenoxy, p-chlorophenoxy, p-tolyloxy and p-anisyloxy; and $R^1$ is a member selected from the group consisting of lower alkyl, trifluoromethyl, alkoxy(lower alkyl) wherein the alkoxy group has from one to three carbon atoms, lower alkylthio-(lower alkyl), cycloalkyl having up to eight carbon atoms, benzyl, p-chlorobenzyl, β-phenylethyl, m-xylyl, p-chlorobenzohydryl, phenyl, p-chlorophenyl, p-tolyl and p-anisyl. Compounds of the above type having the R'O- group at the 8-position of the molecule are also contemplated as being useful in this same respect.

Typical of the member compounds in the present series are such benzothiadiazines as 3-methyl-6-methoxy-1,2,4-benzothiadiazine-1,1-dioxide,
3-methyl-7-methoxy-1,2,4-benzothiadiazine-1,1-dioxide,
3-methyl-7-ethoxy-1,2,4-benzothiadiazine-1,1-dioxide,
3-cyclopropyl-6-bromo-7-isopropoxy-1,2,4-
  benzothiadiazine-1,1-dioxide,
3-benzyl-6-chloro-7-ethoxy-1,2,4-benzothiadiazine-1,1-
  dioxide,
3-trifluoromethyl-7-cyclopropoxy-1,2,4-benzothiadiazine-
  1,1-dioxide,
3-phenyl-6-methoxy-1,2,4-benzothiadiazine-1,1-dioxide,
3-phenyl-6,7-dimethoxy-1,2,4-benzothiadiazine-1,1-
  dioxide, and the like.

The process employed for preparing the compounds of this invention involves treating an appropriately substituted 2-sulfamylaniline of the formulae:

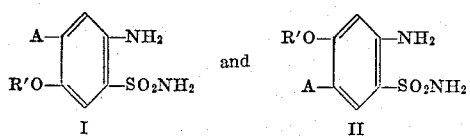

with an ortho ester of an acid of the formula RCOOH, wherein all the symbols are the same as previously defined. This reaction is preferably conducted at a temperature well above room temperature by merely mixing the two reactants together in substantially equimolar proportions and then heating to the desired point. In general, a temperature that is in the range of from about 50° C. up to about the boiling point of the ortho ester will be found to be sufficient, with a temperature in the 110–130° C. range being preferred. The time required for the reaction to take place will vary anywhere from about one-half to about five hours, depending upon the quantities of the materials used and the exact reaction temperatures employed. Although equimolar amounts of reactants are all that are called for, an excess (say, up to about 200% by weight) of the ortho ester may be used to advantage, particularly in view of the fact that it may also function to serve as a solvent for the reaction as well. Alternatively, an inert organic solvent such as one of the N,N-dialkyl lower alkanoamides like N,N-dimethylformamide may also be employed in this connection, in which case the reaction temperature is the reflux temperature of the reaction mixture, but usually the use of such a solvent is not necessary and in many cases would even be uncalled for in view of the expense involved. In any event, the desired products thus obtained are easily recovered from the reaction mixtures by means of such conventional techniques as concentration and/or crystallization, and thereafter purified by means of recrystallization from suitable solvent systems like the aqueous lower alkanols, for example.

The starting materials necessary for the process of this invention, viz., the 2-sulfamyl-4(5)-substituted anilines of Formula I or II and the α-substituted ortho formic esters [e.g., RC (OR″)₃ wherein R″ is lower alkyl], are for the most part either known compounds (such as the orthoformates) or else they are easily prepared by those skilled in the art from more readily available starting materials by techniques which are conventional to the field of synthetic organic chemistry. For instance, the 2-sulfamyl-4(5)-substituted anilines are prepared by the mild selective reduction of the corresponding nitro compounds (i.e., the 2-sulfamyl-4-substituted or 2-sulfamyl-5-substituted nitrobenzenes) with iron filings and ammonium chloride in an aqueous-alkanolic solvent system. The nitro compounds so reduced are obtainable in the first place by subjecting the appropriately substituted di(o-nitrophenyl)disulfide to action of chlorine in aqueous acetic acid followed by treatment with ammonia to form the amide. Finally, the ultimate starting material in this series of reactions, viz., the aforementioned disulfide type compound, is prepared by the method reported by H. H. Hodgson and F. W. Handley in the Journal of the Chemical Society (London), p. 542 (1926), which involves subjecting the appropriately 4- or 5-substituted or 4,5-disubstituted o-chloronitrobenzene to the action of sodium disulfide. Needless to say, the ortho formic esters mentioned above are either known compounds themselves or else they are easily prepared by those skilled in the art from the corresponding known acids (RCOOH).

The bases which are used to prepare the pharmaceutically acceptable salts of this invention are those which form non-toxic salts with the herein described 1,2,4-benzothiadiazine-1,1-dioxides, i.e., where the cation of said salts is essentially non-toxic in character at the dosage range administered. Examples of such cations include those of sodium, potassium, calcium and magnesium. These type salts can all be prepared by either treating the 3,6- or 3,7-disubstituted-1,2,4-benzothiadiazine-1,1-dioxide with an aqueous solution of the pharmacologically acceptable base (i.e., those oxides, hydroxides, carbonates or bicarbonates which contain cations of the foregoing type) and then evaporating the resultant solution to dryness, or by mixing lower alkanolic solutions of said acidic organic compound and the desired alkali metal alkoxide together and then evaporating as before. In either case, stoichiometric quantities of reagents must be employed in order to ensure maximum yields of pure product. Needless to say, salts of these compounds with pharmacologically unacceptable bases may also be formed and while these latter type salts are not therapeutically useful per se, they may be used as intermediates for both the production of the pharmacologically acceptable salts described before as well as for the purification of the present compounds themselves.

As previously indicated, the compounds of the present invention are all readily adapted to therapeutic use as antihypertensive agents of high potency. For instance, 3-methyl-7-methoxy-1,2,4-benzothiadiazine - 1,1 - dioxide at the 40 mg./kg. dosage level in hypertensive rats lowered the blood pressure to a statistically significant degree when orally administered to them, while the same compound in dogs effected a similar change at the 20 mg./kg. dosage level when tested under these same conditions. Additionally, the aforementioned compound was equally effective via the parenteral route, causing a lowering of as much as 25 mm. Hg (190 mm. to 165 mm. Hg) in a 15–30 minute period after drug administration when given to said dogs at the 10 mg./kg. level by means of a stomach tube. Furthermore, the toxicity of these 3,6- and 3,7 - disubstituted-1,2,4-benzothiadiazine-1,1-dioxides has been found to be quite low when they are administered to mice in amounts which are sufficient to achieve the desired therapeutic effects. Moreover, no other harmful pharmacological side effects, such as diuresis, have been observed to occur as a result of their administration. Hence, the present compounds do differ greatly from many of the known prior art agents in this latter respect since said latter compounds often do cause diuresis (particularly if they have a sulfamyl group at the 7-position of the benzothiadiazine molecule) along with the desired hypotensive effect.

In accordance with a method of treatment of the present invention, the herein described antihypertensives can be administered to an agitated subject via the oral or parenteral routes. In general, these compounds are most desirably administered in doses ranging from about 20 mg. up to about 400 mg. per day, although variations will necessarily occur depending upon the weight of the subject being treated and the particular route of administration chosen. However, a dosage level that is in the range of from about 0.28 mg. to about 6.0 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the 1,2,4-benzothiadiazine-1,1-dioxide compounds of this invention for the treatment of agitated subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules. lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular benzothiadiazine dioxides in sesame or peanut oil or in aqueous-propylene glycol may be employed, as well as sterile aqueous solutions of the corresponding water-soluble alkali metal or alkaline-earth metal salts previously enumerated. Such aqueous solutions should be suitably buffered if necessary and the liquid diluent first rendered isotonic with sufficient saline or glucose. These particular aqueous solutions are especially suitable for intravenous injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A stream of dry chlorine gas was bubbled into a mixture consisting of 26.6 g. (0.145 mole) of di(2-nitro-5-methoxyphenyl)disulfide [prepared by the method of H. H. Hodgson et al. as reported in the Journal of the Chemical Society, p. 542 (1926)] in 102 ml. of concentrated hydrochloric acid and 20.4 ml. of concentrated nitric acid at 70° C. After three hours of such treatment, the mixture was cooled to room temperature and the acids layer was decanted from the heavy oil that had formed during the course of the chlorination step. The oil was then taken up in methylene chloride and washed with water. The resulting aqueous phase was then twice extracted with methylene chloride, and the combined methylene chloride layers were, in turn, twice re-extracted with water. After drying the washed solution over anhydrous sodium sulfate and filtering, there was obtained a clear filtrate which was subsequently concentrated in vacuo to afford a heavy oil. Liquid ammonia (800 ml.) was then added to this oil and the resulting mixture was allowed to stand overnight (~16 hours) at room temperature. The residue which resulted after all the excess ammonia had evaporated was then treated with cold NHCl and filtered. In this manner, there were obtained 28.6 g. of crude 2-sulfamyl-4-methoxynitrobenzene, M.P. 130–135° C. This material is used as such for the next step. Recrystallization from water raised the melting point to 140–145.5° C.

*Analysis.*—Calcd. for $C_7H_8N_2O_5S$: C, 36.21; H, 3.47; N, 12.07; S, 13.78. Found: C, 36.33; H, 3.41; N, 12.81; S, 14.06.

Forty-three grams (43 g.) of ammonium chloride in 85 ml. of water and 28.6 g. (0.123 mole) of the crude 2 - sulfamyl - 4 - methoxynitrobenzene (prepared as described above) in 170 ml. of methanol were then mixed together, and the resulting solution was heated to reflux. At this point, 43 g. of finely-divided iron fillings were added to the mixture portionwise over a period of about 1.5 hours and refluxing was thereafter continued for an additional ten minutes. Upon cooling and filtering the reaction mixture, there was obtained a clear filtrate which was subsequently concentrated to dryness under reduced pressure. The resulting residue was then triturated with 143 ml. of water to afford crude 2-sulfamyl-4-methoxyaniline. This material was collected by means of filtration (yield, 17.6 g.; M.P. 125–130° C.) and used as such in the next reaction step.

A mixture consisting of 17.6 g. (0.087 mole) of the crude 2-sulfamyl-4-methoxyaniline (prepared as described above) in 50 ml. of triethylorthoacetate was then heated in an open flask at 125° C. for two hours. At the end of this time, the mixture was cooled to room temperature and the resulting solids filtered therefrom. In this manner, there was obtained 3-methyl-7-methoxy-1,2,4-benzothiadiazine-1,1-dioxide which melted at 276–277° C. after two recrystallizations from ethanol-water (1:1 by volume) in the presence of charcoal. The yield of pure product amounted to 5 g. or 25% of the theoretical value.

*Analysis.*—Calcd. for $C_9H_{10}N_2O_3S$: C, 47.79; H, 4.46; N, 12.39. Found: C, 47.81; H, 4.51; N, 12.21.

Example II

The procedure described in Example I is followed except 0.145 mole of di(2-nitro-4-bromo-5-isopropoxyphenyl)disulfide is employed as the ultimate starting material in this series of reactions and 50 ml. of triethylortho(α-cyclopropyl)formate are used as the condensing agent. In this particular case, the corresponding product obtained is 3-cyclopropyl-6-bromo-7-isopropoxy-1,2,4-benzothiadiazine-1,1-dioxide.

Example III

The procedure described in Example I is followed except 0.145 mole of di(2-nitro-4-chloro-5-ethoxyphenyl) disulfide is employed as the ultimate starting material in this series of reactions and 50 ml. of triethylortho(α-benzyl)formate are used as the condensing agent. In this particular case, the corresponding product obtained is 3 - benzyl - 6 - chloro - 7 - ethoxy - 1,2,4 - benzothiadiazine-1,1-dioxide.

Example IV

The procedure described in Example I is followed except 0.145 mole of di(2-nitro-5-cyclopropoxyphenyl)disulfide is employed as the ultimate starting material in this series of reactions and 50 ml. of triethylortho(α-trifluoromethyl)formate are used as the condensing agent. In this particular case, the corresponding product obtained is 3-trifluoromethyl-7-cyclopropoxy-1,2,4-benzothiadiazine-1,1-dioxide.

Example V

The following 3,7-disubstituted-1,2,4-benzothiodiazine-1,1-dioxides are prepared according to the procedure of Example I from the corresponding starting compounds:

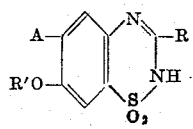

| R | A | R' |
|---|---|---|
| $CH_3$ | H | $C_2H_5$ |
| $C_2H_5$ | Cl | $C_2H_5$ |
| iso-$C_3H_6$ | Br | iso-$C_3H_7$ |
| n-$C_4H_9$ | $CF_3$ | n-$C_4H_9$ |
| iso-$C_5H_{11}$ | $CH_3$ | $CF_3$ |
| n-$C_6H_{13}$ | $C_2H_5$ | $CH_3SCH_2$ |
| $ClCH_2$ | n-$C_3H_7$ | $C_2H_5OC_2H_4$ |
| $BrCH_2$ | $C_6H_5$ | $CH_3OC_3H_6$ |
| $ICH_2$ | p-$ClC_6H_4$ | $CH_3SC_2H_4$ |
| $CF_3$ | p-$CH_3C_6H_4$ | $C_3H_7OCH_2$ |
| $Cl_2CH$ | p-$CH_3OC_6H_4$ | cyclo-$C_3H_5$ |
| $BrC_2H_4$ | $CH_3O$ | cyclo-$C_5H_9$ |
| $IC_3H_6$ | $C_2H_5O$ | cyclo-$C_8H_{15}$ |
| $CH_3SCH_2$ | iso-$C_3H_7O$ | $C_6H_5CH_2$ |
| $C_2H_5OC_2H_4$ | n-$C_4H_9O$ | p-$ClC_6H_4CH_2$ |
| $CH_3OC_3H_6$ | cyclo-$C_3H_5O$ | β-$C_6H_5C_2H_4$ |
| $CH_3SC_2H_4$ | cyclo-$C_5H_9O$ | m-$CH_3C_6H_4CH_2$ |
| $C_3H_7OCH_2$ | cyclo-$C_8H_{15}O$ | p-$ClC_6H_4(C_6H_5)CH$ |
| cyclo-$C_3H_5$ | $C_6H_5CH_2O$ | $C_6H_5$ |
| cyclo-$C_5H_9$ | p-$ClC_6H_4CH_2O$ | p-$ClC_6H_4$ |
| cyclo-$C_8H_{15}$ | β-$C_6H_5C_2H_4O$ | p-$CH_3C_6H_4$ |
| $C_6H_5CH_2$ | m-$CH_3C_6H_4CH_2O$ | p-$CH_3OC_6H_4$ |
| p-$ClC_6H_4CH_2$ | $C_6H_5O$ | $CH_3$ |
| β-$C_6H_5C_2H_4$ | p-$ClC_6H_4O$ | $C_2H_5$ |
| m-$CH_3C_6H_4CH_2$ | p-$CH_3C_6H_4O$ | $CF_3$ |
| $C_6H_5$ | p-$CH_3OC_6H_4O$ | $CH_3SC_2H_4$ |
| p-$ClC_6H_4$ | H | cyclo-$C_3H_5$ |
| p-$CH_3C_6H_4$ | H | $C_6H_5CH_2$ |
| p-$CH_3OC_6H_4$ | H | $CH_3$ |
| $CH_3$ | F | n-$C_4H_9$ |
| iso-$C_5H_{11}$ | Cl | $CH_3OC_3H_6$ |
| $CF_3$ | $CH_3$ | cyclo-$C_5H_9$ |
| $CH_3SCH_2$ | $C_6H_5$ | p-$ClC_6H_4CH_2$ |
| cyclo-$C_8H_{15}$ | $CH_3O$ | $C_6H_5$ |
| $C_6H_5CH_2$ | cyclo-$C_3H_5O$ | $CH_3$ |
| p-$ClC_6H_4$ | $C_6H_5CH_2O$ | $CF_3$ |
| $C_2H_5$ | Br | $CH_3SC_2H_4$ |
| $ClCH_2$ | $C_2H_5$ | cyclo-$C_8H_{15}$ |
| $C_2H_5OC_2H_4$ | p-$ClC_6H_4$ | β-$C_6H_5C_2H_4$ |
| cyclo-$C_4H_7$ | $C_2H_5O$ | p-$ClC_6H_4$ |
| p-$ClC_6H_4CH_2$ | cyclo-$C_6H_{11}O$ | $C_2H_5$ |
| p-$CH_3C_6H_4$ | p-$ClC_6H_4CH_2O$ | $C_3H_7OCH_2$ |
| iso-$C_3H_7$ | $C_6H_5O$ | cyclo-$C_4H_7$ |
| $BrCH_2$ | H | m-$CH_3C_6H_4CH_2$ |
| $CH_3OC_3H_6$ | Cl | p-$CH_3C_6H_4$ |
| cyclo-$C_6H_{11}$ | $CF_3$ | iso-$C_3H_7$ |
| β-$C_6H_5C_2H_4$ | iso-$C_3H_7$ | $CF_3$ |
| p-$CH_3OC_6H_4$ | p-$CH_3C_6H_4$ | $CH_3SCH_2$ |
| n-$C_3H_7$ | iso-$C_3H_7O$ | cyclo-$C_6H_{11}$ |
| $ICH_2$ | cyclo-$C_7H_{13}O$ | $C_6H_5CH_2$ |
| $CH_3SC_2H_4$ | β-$C_6H_5C_2H_4O$ | p-$CH_3OC_6H_4$ |
| cyclo-$C_7H_{13}$ | p-$ClC_6H_4O$ | n-$C_3H_7$ |
| m-$CH_3C_6H_4CH_2$ | H | $CF_3$ |
| $C_6H_5$ | F | $C_2H_5OC_2H_4$ |
| tert.-$C_4H_9$ | $CF_3$ | cyclo-$C_7H_{13}$ |
| $CF_3$ | n-$C_4H_9$ | p-$ClC_6H_4CH_2$ |
| $C_3H_7OCH_2$ | p-$CH_3OC_6H_4$ | $C_6H_5$ |
| $CF_3$ | H | $CH_3$ |

Example VI

The procedure described in Example I is followed except that 0.145 mole of di(2-nitro-4-methoxyphenyl)disulfide is employed as the ultimate starting material in this series of reaction in place of the corresponding 5-substituted isomer. In this particular case, the corresponding product obtained is 3-methyl-6-methoxy-1,2,4-benzothiadiazine-1,1-dioxide, M.P. 254–255° C.

*Analysis.*—Calcd. for $C_9H_{10}N_2O_3S$: C, 47.79; H, 4.46; N, 12.39. Found: C, 48.59; H, 4.59; N, 11.96.

Example VII

The procedure described in Example I is followed except that 0.145 mole of di(2-nitro-4-methoxyphenyl)disulfide is employed as the ultimate starting material in this series of reactions and 50 ml. of triethylortho($\alpha$-phenyl)-formate are used as the condensing agent. In this particular case, the corresponding product obtained is 3-phenyl-6-methoxy-1,2,4-benzothiadiazine-1,1-dioxide.

Example VIII

The procedure described in Example I is followed except 0.145 mole of di(2-nitro-4,5-dimethoxyphenyl)disulfide is employed as the ultimate starting material in this series of reactions and 50 ml. of triethylortho($\alpha$-phenyl)-formate are used as the condensing agent. In this particular case, the corresponding product obtained is 3-phenyl-6-methoxy-1,2,4-benzothiadiazine-1,1'-dioxide.

Example IX

The following 3,6-disubstituted-1,2,4-benzothiadiazine-1,1-dioxides are prepared according to the procedure of Example I from the corresponding starting compounds:

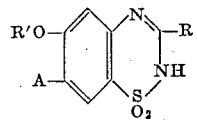

| R | A | R' |
|---|---|---|
| $CH_3$ | H | $C_2H_5$ |
| $C_2H_5$ | Cl | $C_2H_5$ |
| iso-$C_3H_7$ | Br | iso-$C_3H_7$ |
| n-$C_4H_9$ | $CF_3$ | n-$C_4H_9$ |
| iso-$C_5H_{11}$ | $CH_3$ | $CF_3$ |
| n-$C_6H_{13}$ | $C_2H_5$ | $CH_3SCH_2$ |
| $ClCH_2$ | n-$C_3H_7$ | $C_2H_5OC_2H_4$ |
| $BrCH_2$ | $C_6H_5$ | $CH_3OC_2H_6$ |
| $ICH_2$ | p-$ClC_6H_4$ | $CH_3SC_2H_4$ |
| $CF_3$ | p-$CH_3C_6H_4$ | $C_3H_7OCH_2$ |
| $Cl_2CH$ | p-$CH_3OC_6H_4$ | cyclo-$C_3H_5$ |
| $BrC_2H_4$ | $CH_3O$ | cyclo-$C_5H_9$ |
| $IC_3H_6$ | $C_2H_5O$ | cyclo-$C_8H_{15}$ |
| $CH_3SCH_2$ | iso-$C_3H_7O$ | $C_6H_5CH_2$ |
| $C_2H_5OC_2H_4$ | n-$C_4H_9O$ | p-$ClC_6H_4CH_2$ |
| $CH_3OC_2H_6$ | cyclo-$C_3H_5O$ | $\beta$-$C_6H_5C_2H_4$ |
| $CH_3SC_2H_4$ | cyclo-$C_5H_6O$ | m-$CH_3C_6H_4CH_2$ |
| $C_3H_7OCH_2$ | cyclo-$C_8H_{15}O$ | p-$ClC_6H_4(C_6H_5)CH$ |
| cyclo-$C_3H_5$ | $C_6H_5CH_2O$ | $C_6H_5$ |
| cyclo-$C_5H_9$ | p-$ClC_6H_4CH_2O$ | p-$ClC_6H_4$ |
| cyclo-$C_8H_{15}$ | $\beta$-$C_6H_5C_2H_4O$ | p-$CH_3C_6H_4$ |
| $C_6H_5CH_2$ | m-$CH_3C_6H_4CH_2O$ | p-$CH_3OC_6H_4$ |
| p-$ClC_6H_4CH_2$ | $C_6H_5O$ | $CH_3$ |
| $\beta$-$C_6H_5C_2H_4$ | p-$ClC_6H_4O$ | $C_2H_5$ |
| m-$CH_3C_6H_4CH_2$ | p-$CH_3C_6H_4O$ | $CF_3$ |
| $C_6H_5$ | p-$CH_3OC_6H_4O$ | $CH_3SC_2H_4$ |
| p-$ClC_6H_4$ | H | cyclo-$C_3H_5$ |
| p-$CH_3C_6H_4$ | H | $C_6H_5CH_2$ |
| p-$CH_3OC_6H_4$ | H | $CH_3$ |
| $CH_3$ | F | n-$C_4H_9$ |
| iso-$C_5H_{11}$ | Cl | $CH_3OC_3H_6$ |
| $CF_3$ | $CH_3$ | cyclo-$C_5H_9$ |
| $CH_3SCH_2$ | $C_6H_5$ | p-$ClC_6H_4CH_2$ |
| cyclo-$C_8H_{15}$ | $CH_3O$ | $C_6H_5$ |
| $C_6H_5CH_2$ | cyclo-$C_3H_5O$ | $CH_3$ |
| p-$ClC_6H_4$ | $C_6H_5CH_2O$ | $CF_3$ |
| $C_2H_5$ | Br | $CH_3SC_2H_4$ |
| $ClCH_2$ | $C_2H_5$ | cyclo-$C_8H_{15}$ |
| $C_2H_5OC_2H_4$ | p-$ClC_6H_4$ | $\beta$-$C_6H_5C_2H_4$ |
| cyclo-$C_4H_7$ | $C_2H_5O$ | p-$ClC_6H_4$ |
| p-$ClC_6H_4CH_2$ | cyclo-$C_6H_{11}O$ | $C_2H_5$ |
| p-$CH_3C_6H_4$ | p-$ClC_6H_4CH_2O$ | $C_3H_7OCH_2$ |
| iso-$C_3H_7$ | $C_6H_5O$ | cyclo-$C_4H_7$ |
| $BrCH_2$ | H | m-$CH_3C_6H_4CH_2$ |
| $CH_3OC_3H_6$ | Cl | p-$CH_3C_6H_4$ |
| cyclo-$C_6H_{11}$ | $CF_3$ | iso-$C_3H_7$ |
| $\beta$-$C_6H_5C_2H_4$ | iso-$C_3H_7$ | $CF_3$ |
| p-$CH_3OC_6H_4$ | p-$CH_3C_6H_4$ | $CH_3SCH_2$ |
| n-$C_3H_7$ | iso-$C_3H_7O$ | cyclo-$C_6H_{11}$ |
| $ICH_2$ | cyclo-$C_7H_{13}O$ | $C_6H_5CH_2$ |
| $CH_3SC_2H_4$ | $\beta$-$C_6H_5C_2H_4O$ | p-$CH_3OC_6H_4$ |
| cyclo-$C_7H_{13}$ | p-$ClC_6H_4O$ | n-$C_3H_7$ |
| m-$CH_3C_6H_4CH_2$ | H | $CF_3$ |
| $C_6H_5$ | F | $C_2H_5OC_2H_4$ |
| tert.-$C_4H_9$ | $CF_3$ | cyclo-$C_7H_{13}$ |
| $CF_3$ | n-$C_4H_9$ | p-$ClC_6H_4CH_2$ |
| $C_3H_7OCH_2$ | p-$CH_3OC_6H_4$ | $C_6H_5$ |
| $CF_3$ | H | $CH_3$ |
| $CH_3$ | Cl | $CH_3$ |

Example X

The sodium salt of 3-methyl-7-methoxy-1,2,4-benzothiadiazine-1,1-dioxide is prepared by dissolving said compound in anhydrous methanol and then adding said solution to another methanolic solution which contains an equivalent amount in moles of sodium methoxide. Upon evaporation of the solvent via freeze-drying, there is obtained the desired alkali metal salt in the form of a white solid powder which is freely-soluble in water.

In like manner, the potassium and lithium salts are also prepared, as are the alkali metal salts of all the other 1,2,4-benzothiadiazines described in Examples II–IX.

Example XI

The magnesium salt of 3-methyl-6-methoxy-1,2,4-benzothiadiazine-1,1-dioxide is prepared by dissolving said compound in water containing an equivalent amount in moles of magnesium oxide and then freeze-drying the mixture. The calcium salt is prepared in like manner, as are all the other alkaline-earth metal salts of this compound as well as of those described in Examples II–IX.

Example XII

A dry solid pharmaceutical composition is prepared by blending the following materials together in the proportions by weight specified below:

| | |
|---|---|
| 3-methyl-7-methoxy-1,2,4-benzothiadiazine-1,1-dioxide | 10 |
| Dicalcium phosphate | 45 |
| Potato starch | 20 |
| Lactose | 15 |
| Polyvinylpyrrolidone | 8 |
| Magnesium stearate | 2 |

After the dried composition is thoroughly blended, tablets are punched from the resulting mixture, each tablet being of such size that it contains 40 mg. of the active ingredient.

Example XIII

A dry solid pharmaceutical composition is prepared by combining the following materials in the proportions by weight specified below:

| | |
|---|---|
| 3-methyl-6-methoxy1,2,4-benzothiadiazine-1,1-dioxide | 30 |
| Polyethylene glycol (average molecular weight, 6000) | 25 |
| Lactose | 30 |
| Calcium carbonate | 15 |

The dried solid mixture so prepared is then thoroughly agitated so as to obtain a powdered product that is completely uniform in every respect. Soft elastic and hard-filled gelatin capsules containing this pharmaceutical composition are then subsequently prepared, employing a sufficient quantity of material in each case so as to provide each capsule with 100 mg. of the active ingredient.

What is claimed is:

1. A compound selected from the group consisting of 1,2,4-benzothiadiazine-1,1-dioxides of the formula:

and salts thereof with pharmacologically acceptable bases, wherein R is a member selected from the group consisting of alkyl having from one to six carbon atoms, lower haloalkyl, alkoxy(lower alkyl) wherein the alkoxy group has from one to three carbon atoms, lower alkyl-thio-(lower alkyl), cycloalkyl having up to eight carbon atoms, benzyl, p-chlorobenzyl, β-phenylethyl, m-xylyl, phenyl, p-chlorophenyl, p-tolyl and p-anisyl; A is a member selected from the group consisting of hydrogen, fluorine, chlorine, bromine, trifluoromethyl, lower alkyl, phenyl, p-chlorophenyl, p-tolyl, p-anisyl, lower alkoxy, cycloalkoxy having up to eight carbon atoms, benzyloxy, p-chlorobenzyloxy, β-phenylethyloxy, m-xylyloxy, phenoxy, p-chlorophenoxy, p-tolyloxy and p-anisyloxy; and R' is a member selected from the group consisting of lower alkyl, trifluoromethyl, alkoxy(lower alkyl) wherein the alkoxy group has from one to three carbon atoms, lower alkylthio-(lower alkyl), cycloalkyl having up to eight carbon atoms, benzyl, p-chlorobenzyl, β-phenylethyl, m-xylyl, p-chlorobenzohydryl, phenyl, p-chlorophenyl, p-tolyl and p-anisyl.

2. 3-methyl - 7 - methoxy-1,2,4-benzothiadiazine-1,1-dioxide.

3. 3-cyclopropyl - 6 - bromo-7-isopropoxy-1,2,4-benzothiadiazine-1,1-dioxide.

4. 3 - benzyl - 6 - chloro-7-ethoxy-1,2,4-benzothiadiazine-1,1-dioxide.

5. 3 - trifluoromethyl - 7 - methoxy-1,2,4-benzothiadiazine-1,1-dioxide.

6. 3 - trifluoromethyl - 7 - cyclopropoxy-1,2,4-benzothiadiazine-1,1-dioxide.

7. 3-methyl - 6 - methoxy-1,2,4-benzothiadiazine-1,1-dioxide.

8. 3-methyl - 6 - methoxy-7-chloro-1,2,4-benzothiadiazine-1,1-dioxide.

9. 3-phenyl - 6 - methoxy-1,2,4-benzothiadiazine-1,1-dioxide.

10. 3-phenyl - 6,7 - dimethoxy-1,2,4-benzothiadiazine-1,1-dioxide.

11. A compound as claimed in claim 1 wherein R is alkyl having from one to six carbon atoms, A is hydrogen and R' is lower alkyl.

12. A compound as claimed in claim 1 wherein R is phenyl, A is hydrogen and R' is lower alkyl.

13. A compound selected from the group consisting of 1,2,4-benzothiadiazine-1,1-dioxides of the formula

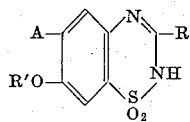

and salts thereof with pharmacologically acceptable bases, wherein R is a member selected from the group consisting of alkyl having from one to six carbon atoms, lower haloalkyl alkoxy(lower alkyl) wherein the alkoxy group has from one to three carbon atoms, lower alkylthio-(lower alkyl), cycloalkyl having up to eight carbon atoms, benzyl, p-chlorobenzyl, β-phenylethyl, m-xylyl, phenyl, p-chlorophenyl, p-tolyl and p-anisyl; A is a member selected from the group consisting of hydrogen, fluorine, chlorine, bromine, trifluoromethyl, lower alkyl, phenyl, p-chlorophenyl, p-tolyl, p-anisyl, lower alkoxy, cycloalkoxy having up to eight carbon atoms, benzyloxy, p-chlorobenzyloxy, β-phenylethyloxy, m-xylyloxy, phenoxy, p-chlorophenoxy, p-tolyloxy and p-anisyloxy; and R' is a member selected from the group consisting of lower alkyl, trifluoromethyl, alkoxy(lower alkyl) wherein the alkoxy group has from one to three carbon atoms, lower alkylthio-(lower alkyl), cycloalkyl having up to eight carbon atoms, benzyl, p-chlorobenzyl, β-phenylethyl, m-xylyl, p-chlorobenzohydryl, phenyl, p-chlorophenyl, p-tolyl and p-anisyl.

14. 3 - methyl - 6 - methoxy-7-chloro-1,2,4-benzothiadiazine-1,1-dioxide.

References Cited by the Examiner
UNITED STATES PATENTS

| | | | |
|---|---|---|---|
| 2,986,573 | 5/1961 | Topliss et al. | 260—243 |
| 3,043,840 | 7/1962 | Downing | 260—243 |
| 3,102,882 | 9/1963 | McManus et al. | 260—243 |

OTHER REFERENCES

Short et al.: Jour. Amer. Chem. Soc., vol. 82, pp. 1135–1138 (1960).

NICHOLAS S. RIZZO, *Primary Examiner.*